Figure 1:
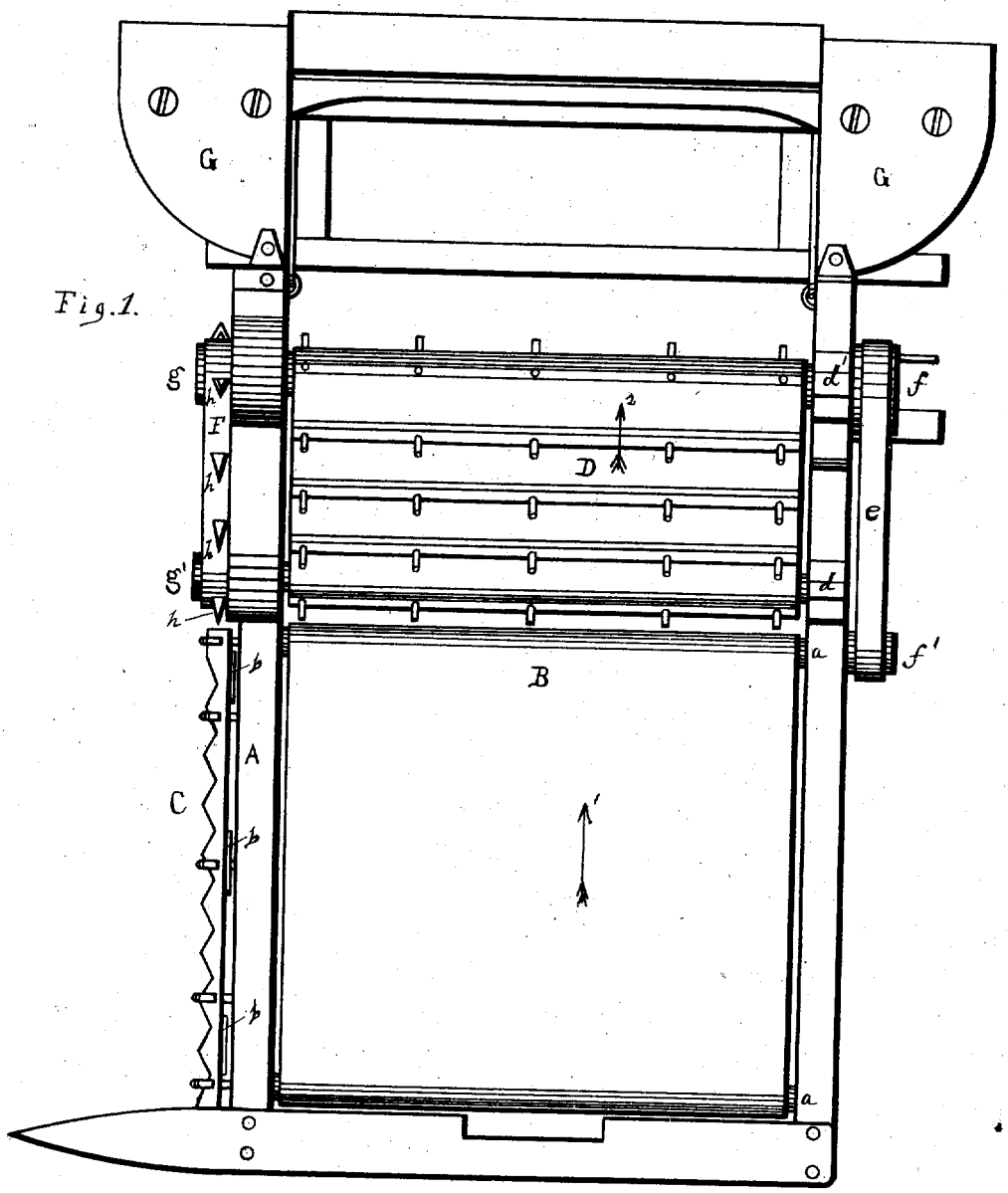

2 Sheets--Sheet 1.

C. W. & W. W. MARSH.

Harvesters.

No. 6,223.

Reissued Jan. 12, 1875.

WITNESSES:

David T. Lask

E. A. West

INVENTORS:

Charles W. Marsh

William W. Marsh

N. PETERS, PHOTO-LITHOGRAPHER, WASHINGTON, D. C.

2 Sheets--Sheet 2.
C. W. & W. W. MARSH.
Harvesters.
No. 6,223.
Reissued Jan. 12, 1875.
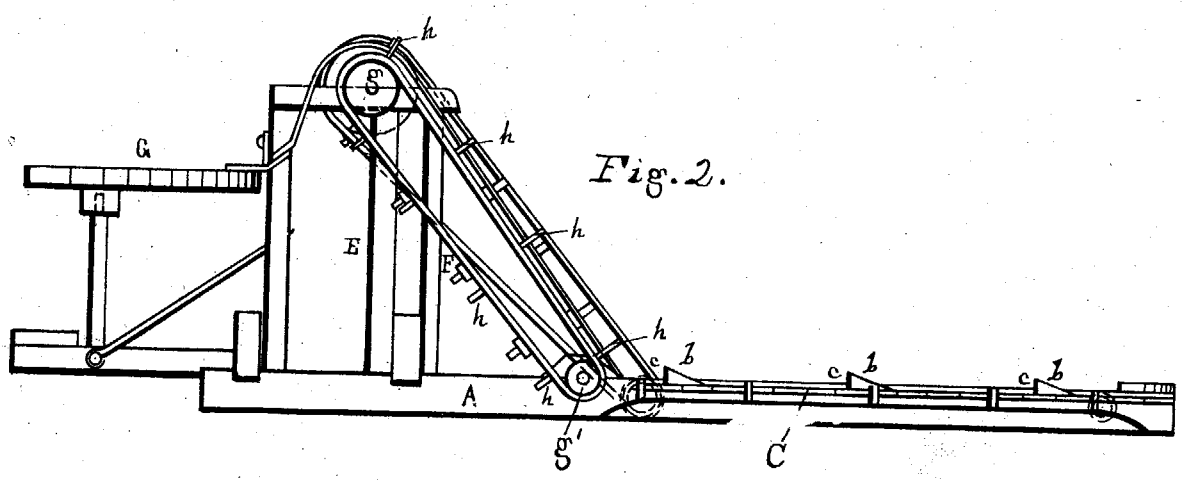
WITNESSES:
Saml F. Fask
E. A. West
INVENTORS:
Charles W. Marsh
William W. Marsh
N. PETERS, PHOTO-LITHOGRAPHER, WASHINGTON, D. C.

UNITED STATES PATENT OFFICE.

CHARLES W. MARSH AND WILLIAM W. MARSH, OF SYCAMORE, ILLINOIS.

IMPROVEMENT IN HARVESTERS.

Specification forming part of Letters Patent No. 41,080, dated January 5, 1864; reissue No. 6,223, dated January 12, 1875; application filed December 10, 1874.

DIVISION A.

*To all whom it may concern:*

Be it known that we, CHARLES W. MARSH and WILLIAM W. MARSH, formerly of Shabbona, in the county of De Kalb and State of Illinois, now of Sycamore, in said county and State, have invented a new and Improved Raking Device for Harvesters; and we do hereby declare that the following is a full, clear, and exact description of the same, reference being had to the accompanying drawings, consisting of two sheets, making a part of this specification, in which—

Figure 1 is a top or plan view, and Fig. 2 a front elevation.

To enable others skilled in the art to make and use our machine, we will proceed to describe it.

A represents a horizontal rectangular frame, in which a horizontal band, B, is placed and fitted over rollers *a a*. This band or carrier B extends over the whole width of the space in frame A, as shown, and moves in the direction indicated by the arrow 1. C represents the sickle, which may be of the ordinary reciprocating kind, and works at the front of the frame A. This sickle is provided with a series of upright ribs or projections, *b*, attached to its back part, the upper edges of which (said ribs or projections) are inclined, so as to leave a vertical face, *c*, at one end, while the upper edges are inclined downward and backward, as shown at Fig. 2. D represents an endless toothed apron, or what may be termed an endless band of rakes. This toothed apron D has an inclined position, and works over rollers *d d'*, one of which, *d*, has its bearings in the frame A, and the other, *d'*, in an upright frame, E, which is attached to the frame A. The toothed apron D moves in the direction indicated by the arrow 2, and the aprons or carriers D B are moved by power applied to the upper roller, *d'*, of the apron D, motion being communicated from the roller *d'* to one of the rollers *a* by a suitable belt, *e*. The pulleys *f f'*, over which the belt *e* passes, are of different diameters, the pulley *f* of the roller *d'* being of a larger diameter than the pulley *f'* of the roller *a;* hence it will be seen that the band B will move faster than the toothed apron D. F is a belt, which passes around pulleys *g g'* at the ends of the rollers *d' d*, and they are extensions of said rollers. This belt is provided with teeth *h* at suitable distances apart. This belt F forms a part of the elevator, and projects forward in line, or nearly in line, with the front edge of the sickle C.

In operation, as the harvester is drawn along, the grain cut by the sickle C falls upon the band or carrier B. This band, by its movement, conveys the grain to the toothed apron D, the butts of the grain being at the front edge of this band or carrier B. The grain, owing to the movement of the belt, does not fall on the carrier at right angles with the sickle C or band B, but will fall more or less obliquely, according to the position in which it may stand when cut, and the rapidity with which the carrier B moves, the heads of the grain being in advance. The grain or straw is brought at, or nearly at, right angles with the band B by two different means, one being the ribs or projections *b* on the back of the sickle C, which, as the sickle moves back, pass under the butts of the straw, and on the return movement catch in the butts and move them forward toward the elevator D F, which movement is repeated at each stroke of the sickle. The other means of straightening the grain, or bringing the straw parallel, consists in the difference of speed between the band or carrier B and the toothed apron D. In consequence of the former having a faster movement than the latter the grain will be straightened and brought at, or nearly at, right angles with the lower edge of the toothed apron, so that the grain will ascend, or be carried up by the elevators F D, and delivered upon the receiver in the position required for binding. The movement of the grain in the inclined position in which it falls and the straightening of it against the elevators tend to advance the butts forward on the machine, which increases the difficulty of elevating it. To overcome this difficulty, we make the elevator wider than the band or carrier B, by means of an additional belt or section, F, so that, while the grain is being carried up, the toothed belt or part F of the elevator holds the butts of the stalks, and prevents them from lagging or falling over. Thus it will be seen that the grain will be discharged from the upper end of the elevator D F with the straw all parallel, or nearly so, with it, and the grain, consequently, can be taken from the box or receptacle, into which it is discharged in an even state, so that it may be bound with facility.

G G represent the binders' table or tables, secured to the frame A. The receptacle into which the grain is discharged (not represented) may be just below the upper elevation or end of the toothed apron D.

What we claim as new is as follows:

1. The combination of the sickle C, provided with the ribs or projections *b*, with the endless band B and toothed apron D, substantially as and for the purpose specified.

2. The toothed belt F, in combination with the toothed apron D and endless band B, as and for the purpose specified.

3. A grain-elevating mechanism having its front part arranged to operate on or near to the cutting line, substantially as and for the purpose specified.

CHARLES W. MARSH.
WILLIAM W. MARSH.

Witnesses:
GEO. S. ROBINSON,
M. M. KETCHAM.